June 20, 1967     P. DIERICK     3,327,266
HIGH VOLTAGE WINDING FOR ELECTRIC TRANSFORMERS
Filed Jan. 11, 1965     5 Sheets-Sheet 1
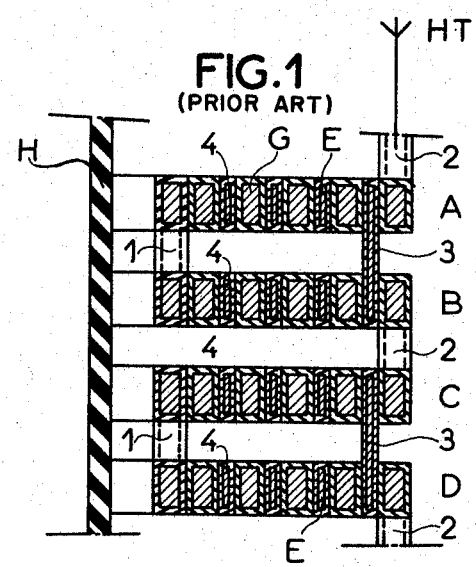
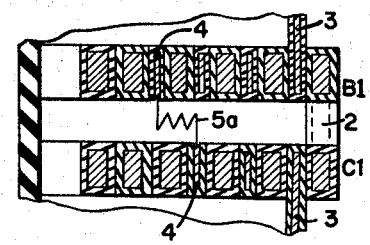
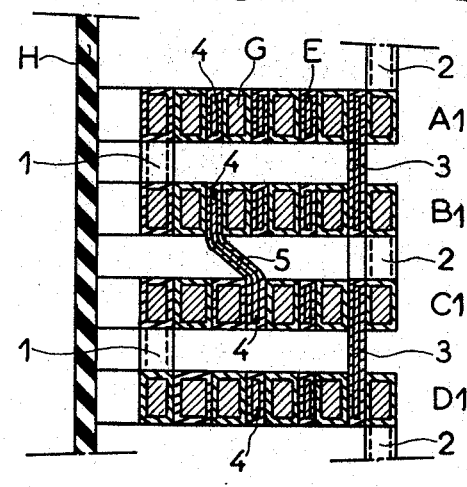
Inventor:
Pierre Dierick June 20, 1967 P. DIERICK 3,327,266
HIGH VOLTAGE WINDING FOR ELECTRIC TRANSFORMERS
Filed Jan. 11, 1965 5 Sheets-Sheet 4

HIGH VOLTAGE WINDING FOR ELECTRIC TRANSFORMERS

Pierre Dierick, Aix-les-Bains, France, assignor to Compagnie Generale d'Electricite, Paris, France, a corporation of France
Filed Jan. 11, 1965, Ser. No. 424,654
Claims priority, application France, Jan. 10, 1964, 959,914
10 Claims. (Cl. 336—70)

According to known prior art, steep-fronted voltage surges are distributed amongst successive disc coils of a high voltage winding by increasing the series capacitance of the winding by means of capacitive couplings. In particular, a known technique consists in using, for making such couplings, insulated conducting screens coupled capacitively each to two disc coils of the winding.

More particularly, according to known prior art, these insulated screens are intercalated between the turns of the disc coils to be coupled together.

According to one embodiment, the screens intercalated between the turns of the disc coils are made up of insulated conducting metallic tapes which are spiral-wound, and the turns of which are intercalated between those of the winding conductors conducting the current.

It has, however, been found that the steep-front surges may induce voltage oscillations mainly at the end of the spiral-wound screens.

Our present invention is aimed at preventing such oscillations. The object of the invention is a high voltage inductive winding comprising, on the one part, spiral-wound flat disc coils connected between themselves by the same ends of the spirals, and, on the other part, insulated conducting screens in the shape of tapes which are each capacitively coupled to two disc coils, each of the latter containing one end of the tape screen, this screen being spiral-wound in these disc coils between the winding turns nearest the corresponding ends of the disc coils, this tape winding comprising at least one electric coupling between two ends of the different conducting tape screens, themselves coupled each to two disc coils, this coupling between the screen ends being such as to determine said screen ends potentials one with respect to the other.

According to a preferred embodiment of the invention, two electrically coupled screen ends are located within two consecutive disc coils.

According to a further embodiment of the invention, at least one electric coupling between two tape screen ends is made up of a direct connection between these screen ends.

According to a further embodiment of the invention, at least one electric coupling between two tape screen ends consists of an electric impedance which is connected to these tape ends and is such as to determine the ends potentials one with respect to the other.

According to a further embodiment of the invention, said electric impedance consists of an annular capacitor located in the interspace between two consecutive disc coils where the two screen ends to be coupled together are located.

According to a further embodiment of the invention, two tape screen ends located within two consecutive disc coils are connected respectively to two conducting shields each surrounding at least partially the turns of one of the disc coils, these two shields being located one with respect to the other so as to achieve between themselves a capacitive coupling.

According to a further embodiment of the invention, an auxiliary conducting tape screen is wound, on a short length, against each of the ends of two different tape screens.

According to a still further embodiment of the invention, an auxiliary conducting tape screen is connected to one of the two tape screen ends to be coupled and besides, it is wound on a short length against the other tape screen end to be coupled.

According to a particular embodiment of the invention, the coupling between two screen ends is made up of a resistor, particularly a non-linear resistor with a resistance decreasing with the voltage between its terminals.

Other features of the invention will be apparent from the following description of embodiments with reference to the accompanying drawings, wherein:

FIGURE 1 is a schematic section of two double disc coils at the input of a high voltage winding, each provided, in a known way, with a conducting tape screen spiral-wound between the disc coil conductors.

FIGURE 2 is a schematic section of two double disc coils at the input of a high voltage winding with a direct connection between the screens of the two double disc coils.

FIG. 2a shows a fragmentary portion of FIG. 2, wherein the connection between the screens of the two double disc coils is a resistor.

Figure 3:
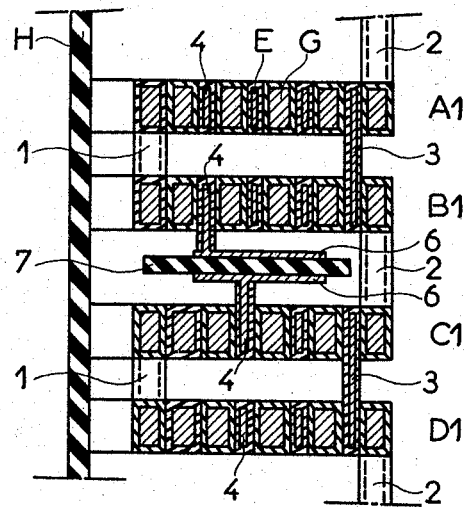
FIGURE 3 is a schematic section of two double disc coils with an annular coupling capacitor between the ends of the screens of the two double disc coils.

These embodiments concern transformer high voltage windings mounted around a magnetic core on an insulating cylinder H as shown in FIGURE 1.

These windings are made up, in a known way, of flat disc coils such as A, B, C, D, constituted by a flat conductor G spiral-wound between the outer and inner borders of each disc coil.

The single disc coils A and B are connected to each other on the inner side by a conductor 1 so as to make up a double disc coil connected on its outer side by link conductors 2, for instance to the high voltage input H.T. terminal and to the next double disc coil made up in a similar way by the single disc coil C and D.

Besides, each of these double disc coils comprises, also in a known way, an insulated conducting tape screen E which is capacitively coupled to each of the single disc coils so as to ensure the winding protection against surges.

The tape screen E is made up of two parts which are linked by a connection conductor 3 which may be constituted by the tape itself. The two parts of the screen E are spiral-wound in the two single disc coils, over a part of the disc coils, up to the ends 4 of the screen, their turns being intercalated between those of the conductor G which are the nearest to the coils' outer borders.

The number of turns of the screens E in each disc coil generally decreases from the first disc coil so as to reduce gradually the capacitive series energy of the inlet coils, starting from the input double disc coil where it is a maximum.

Thus, a favourable distribution of the electric potentials is achieved. It has, however, been found, in the course of tests where a steep front wave is applied—particularly when the application is interrupted after a maximum value has been reached—that voltage oscillations may take place in all or part of the winding and particularly between the free ends 4 of the screens in the single disc coils B and C.

Our present invention enables to decrease to a large extent the maximum amplitude of these voltage oscillations. Moreover, it may enable, in certain applications, to increase the capacitive series energy of the input coils and thus to improve the distribution of the electric potentials.

The embodiment of the invention as shown in FIGURE 2 relates to two double disc coils $A_1, B_1$ and $C_1, D_1$, identical to those shown in FIGURE 1; however, the ends 4 of the tape screens located in the consecutive single disc coils $B_1$ and $C_1$ are connected to each other directly with a connection conductor 5. According to the embodiment shown here, the connecting conductor is the tape screen E itself which runs consecutively through the four single disc coils.

The voltage oscillations are thus eliminated within these double disc coils. They may, however, still exist at other places in the winding.

The winding is then provided with other similar conducting screens, the adjoining free ends of which are electrically coupled so as to determine one with respect to the other the potentials of these free ends.

This coupling may be of the capacitive type as shown in example of FIGURE 3.

This example is applied to two consecutive double disc coils $A_1, B_1$ and $C_1, D_1$, for instance to input double disc coils. The single disc coils $A_1, B_1, C_1, D_1$ are similarly constituted by a conductor G, spiral-wound, and they are similarly connected two by two by conductors 1 so as to make up double disc coils connected to each other by conductors 2.

An insulated conducting tape screen E is intercalated in a similar way between the turns of each double disc coil, but the number of screen turns may be decreasing.

The ends 4 of the screen E located in the disc coils $B_1$ and $C_1$ are connected respectively to the plates 6 of an annular capacitor which are separated by a dielectric 7. The electrode of the capacitor may be made up of split rings of conducting metal, such as copper, aluminium, nickel, silver. The split rings may, however, be spaced without interposition of a dielectric 7.

The split rings can be obtained by projecting or depositing conducting substances onto an insulating material. Such projecting or depositing can be performed on the surfaces facing the disc coils $B_1$ and $C_1$ where they will be connected to the ends 4 of the screens of these disc coils.

These split rings may be subdivided into ring sections when the desired capacitance must be lower.

The annular capacitor electrodes are beneficially subdivided so as to decrease the eddy current losses, particularly as shown in the following examples.

Figure 4:
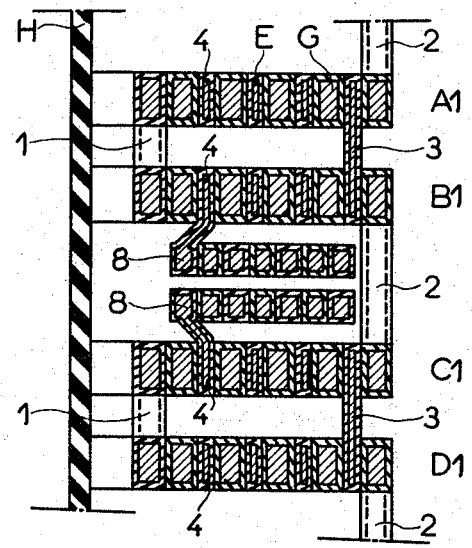
FIGURE 4 shows two double disc coils with a variant of an annular capacitor.

The electrodes may be constructed as shown in the example of FIGURE 4 wherein the two double disc coils shown are identical to those of the previous example.

The capacitor electrodes, connected to the ends 4 of the screen E between the disc coils $B_1$ and $C_1$, are each made up of a conductor 8 spiral-wound in a plane and linked to a screen end 4 by one of the spiral ends of this conductor 8. According to a variant, the annular capacitor electrode may be constituted by two conductors which are spiral- wound in a same plane, the turns of one of them being intercalated between the turns of the other.

Figure 5:
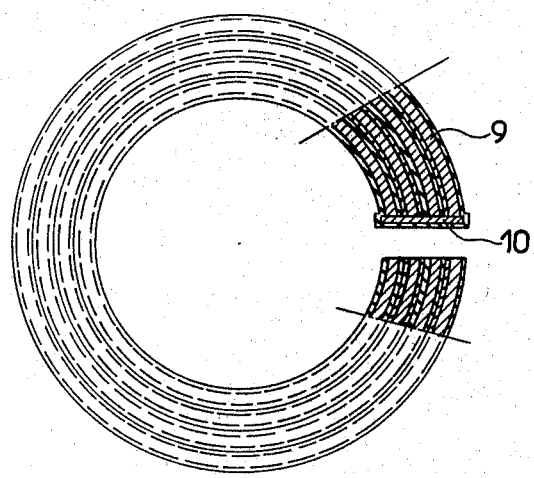
FIGURE 5 is a plan view of an electrode of an annular capacitor according to a third variant.

According to the variant of FIGURE 5, the capacitor split ring plates are made up of concentric conductors 9, which, in the given example, are insulated, but which could be uninsulated and adequately spaced.

These conductors 9 are connected, for instance at their ends, by a link conductor 10 which connects them to a screen end 4.

Figure 6:
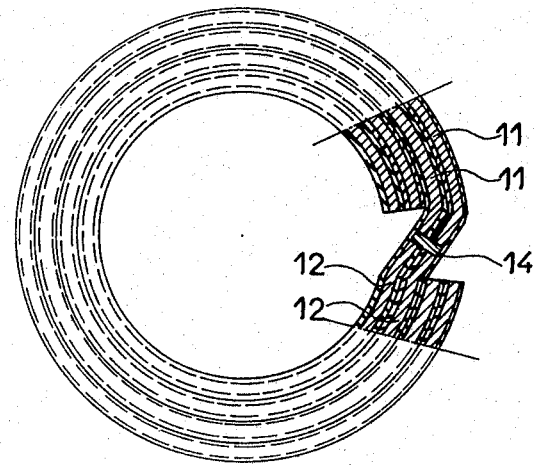
FIGURE 6 is a plan view of an electrode of an annular capacitor according to a fourth variant.

According to the variant of FIGURE 6, the annular electrodes are made up of two concentric side by side conductors 11 connected at their ends to a link conductor 14 connecting them to a screen end 4. Two other concentric side by side conductors 12 are located on the inner side of the latter ones and are connected to the link conductor 14 by their ends opposite the connected ends of the conductors 11.

The space between the annular electrodes of the above described capacitors will be a function of the distribution of the potentials within the winding and will, consequently, depend upon the characteristics of this winding. Their cross-sections may differ from the ones shown and be designed so as to achieve the best possible distribution of the electric fields.

Figure 7:
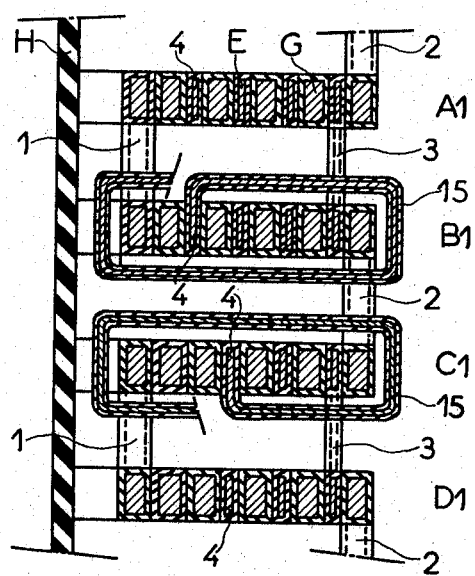
FIGURES 7 and 8 are respectively a schematic section and a plan view of a capacitive coupling between screens by means of conducting shields surrounding consecutive single disc coils.
Figure 8:
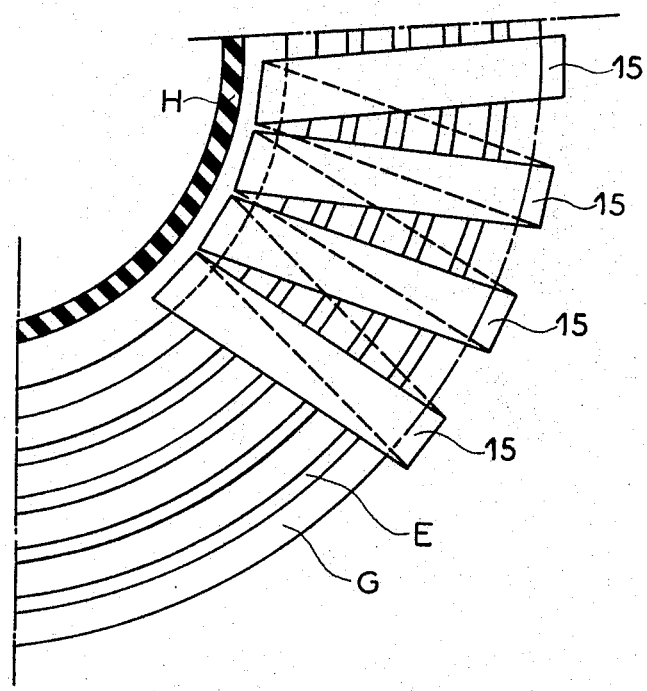

The capacitive coupling between two screen ends located within consecutive disc coils may also be achieved by connecting these ends to conducting covers surrounding each of the disc coils as shown in FIGURES 7 and 8.

The disc coils shown are identical to those of the previous example and comprise two insulated conducting tape screens E in the double disc coils $A_1, B_1$ and $C_1, D_1$.

The screen ends 4 located in the disc coils $B_1$ and $C_1$ are each connected to a tape conducting cover 15 which is wound, according to a helix with loosely wound turns, around the corresponding disc coil and, in the example shown, on part only of the disc coil. This helix could, however, extend on the whole disc coil and its turns could be close-wound.

The cover 15 may surround the whole of the disc coil turns, as in the example shown, or alternatively only a part of the turns. The cover may be constituted by either a metallic strip, or by an insulating strip provided with a coating by metallizing, or also by direct metallizing of the disc coil outer part. The faces of the covers 15 of the disc coils $B_1$ and $C_1$ will face each other and will have the same dimensions but it will not matter if these dimensions, however, differ.

Figure 9:
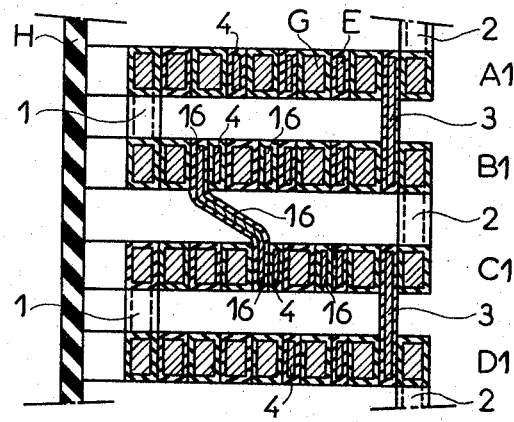
FIGURE 9 is a schematic section of two double disc coils where the coupling between screens is by means of an auxiliary conducting tape screen.

According to another coupling arrangement between the ends of distinct screens, this coupling is achieved by means of an auxiliary conducting tape screen as shown in FIGURE 9. This example relates generally to two double disc coils $A_1, B_1$ and $C_1, D_1$ identical to the above-mentioned ones and each comprising an insulated conducting tape screen E. The screen ends 4 located within the disc coils $B_1$ and $C_1$ are capacitively coupled to each other by means of an auxiliary screen 16 which is also made up of an insulating conducting tape. This screen 16 is spiral-wound, within the disc coil $B_1$, against the screen E, starting from its end 4, and extends over slightly more than one turn. The screen 16 is further similarly wound, within the disc coil $C_1$, against the screen E, starting from its end 4.

The screen 16 is not necessarily insulated. It may be wound within the disc coils $B_1$ and $C_1$, not starting from the ends 4 of the screen E, but from a given point of the screen E so as to reach its end 4 after running along a sufficient length of the screen E in order to achieve a coupling which enables to distribute the winding potential as desired.

Figure 10:
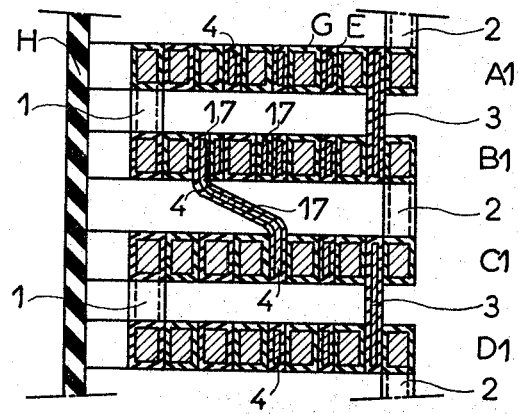
FIGURE 10 is a schematic section of two double disc coils with a variant of the coupling by means of an auxiliary screen.

FIGURE 10 is a coupling variant achieved by means of an auxiliary screen which is used for screens E identical to those of the example above. The auxiliary screen shown in 17 is connected directly to the end 4 of the screen E of the disc coil $C_1$. This screen 17 is, as in the previous case, coupled to the screen E of the disc coil $B_1$ and is spiral-wound, between the turns of the disc coil $C_1$, against the screen E, starting from its end 4.

Figure 11:
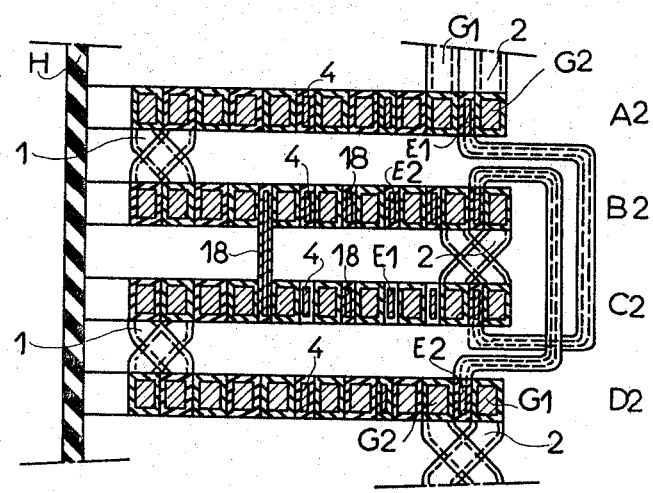
FIGURE 11 is a schematic section of two double disc coils with another variant of the coupling by means of an auxiliary screen.

The coupling variant achieved by means of an auxiliary screen as shown in FIGURE 11 is used for a winding of a different type. This winding is made up of single disc coils $A_2$, $B_2$, $C_2$, $D_2$, each comprising two conductors $G_1$ and $G_2$ in parallel, which are side by side wound, along a spiral, between the inner and outer limits of the disc coil. The disc coils $A_2$ and $B_2$, as well as the disc coils $C_2$ and $D_2$ are connected to each other in a known way, by conductors 1 so as to make up double disc coils which are connected to each other, also in a known way, by conductors 2.

The two double disc coils thus constituted comprise two insulated conducting tape screens $E_1$ and $E_2$. These screens are located, within the disc coils, between the two conductors in parallel $G_1$ and $G_2$ and are thus coupled on both their faces with the conductors. The screen $E_1$ is spiral-wound within the disc coils $A_2$ and $C_2$ up to its ends 4. The screen $E_2$ is wound in a similar way within the disc coils $B_2$ and $D_2$, up to its ends 4.

The invention benefits from this arrangement by intercalating the auxiliary screen of the previous example within the spaces left free between the conductors $G_1$ and $G_2$ of distinct turns. This screen shown in 18 is wound within the disc coils $B_2$ and $C_2$, starting from points located in front of the ends 4 of the screens $E_1$ and $E_2$ and the wound length is selected so that the coupling between the screens $E_1$ and $E_2$ determine their potentials one with respect to the other at their ends 4.

These embodiments of the invention have been described as non limiting examples. The electric coupling between the ends of distinct insulated conducting tape screens may be achieved possibly by means of an electric resistor and more particularly by a non linear resistor, the resistance of which decreases with the voltage between its terminals. This is shown in an exemplary symbolic manner in FIG. 2a where the ends 4 of the tape screens are interconnected by resistor 5a.

It should be understood that it is possible to use within a same winding several different coupling means between screen ends, selecting the most appropriate ones among those mentioned above. These different coupling means may not only be used distinctly in various parts of the winding but they may be combined together for a same coupling between two screen ends.

It is to be understood that the conducting screens which have been described may be constructed in any other way. They may, for instance, be made up of conducting covers surrounding at least partially the conductors G of the disc coils.

What I claim:
1. High voltage transformer winding comprising:
 (a) a plurality of flat annular discs coaxially aligned, each of said discs formed by at least one conductor wound with several turns in the same plane,
 (b) a plurality of consecutive double-discs each formed by two of said discs connected to one another at one of their adjacent extremities, the two other adjacent extremities connected respectively to adjacent double-discs, the first double-disc being connected to the terminal of said winding,
 (c) in at least one part of each of said double-discs, beginning from one end of the winding, each double-disc comprising two insulated conductor screens formed by a plurality of non-interrupted turns interlaced each in one of two of said discs of said double-disc between the turns of the conductor normally carrying the current, said two conductor screens of the same double-disc being electrically interconnected at their opposed ends at the connection between the conductors normally carrying the current in said two discs of said double-disc, and
 (d) electrical connections between said screens of adjacent discs of different double-discs at the extremities of the screens opposed to the connection between the screens of a same double-disc, whereby said electrical connections are formed to fix, one with respect to the other, the potentials of the extremities of the connected screens.

2. In the structure according to claim 1, wherein at least one of said electrical connections between the screens of said discs of different double-discs is formed by a direct connection.

3. The structure according to claim 1, wherein at least one of said electrical connections between said screens of said discs of different double-discs is formed by an annular condenser located in the space between two of said double-discs, said condenser electrically connecting said screens, the simple neighboring discs, at the extremities of the screens opposed to the connection between the screens of the same double-discs.

4. The structure according to claim 3, wherein said annular condenser is composed of armatures formed by spirals disposed side by side in the same plane.

5. The structure according to claim 3, wherein said annular condenser is composed of armatures formed by annular concentric conductors lying in the same plane.

6. The structure according to claim 1, wherein two extremities of said screens of said discs of different double-discs are respectively connected to two conducting envelopes each of which surrounds at least partially the turns of a corresponding disc, said two envelopes positioned face to face to form a capacitive coupling therebetween.

7. The structure according to claim 1, wherein an auxiliary conducting screen having a ribbon-shape is wound along a short length against each of said two extremities of said screens for electrical coupling.

8. The structure according to claim 1, wherein an auxiliary conducting screen having a ribbon-shape is connected to one of said two extremities of said screens for coupling and being wound onto a short length against the other extremity of said screen.

9. The structure according to claim 1, wherein at least one of said electrical connections between said screens of said discs of different double-discs is formed by an electric resistance.

10. The structure according to claim 9, wherein said electric resistance is a non-linear resistance, the resistance of which diminishes as a function of the voltage at its terminals.

References Cited

UNITED STATES PATENTS

| | | | |
|---|---|---|---|
| 1,352,360 | 9/1920 | Dwyer | 336—70 |
| 2,155,840 | 4/1939 | Rorden | 336—70 |
| 2,905,911 | 9/1959 | Kurita | 336—70 |
| 3,160,838 | 11/1964 | Bedil | 336—69 |

LEWIS H. MYERS, *Primary Examiner.*

T. J. KOZMA, *Assistant Examiner.*